United States Patent [19]
Slaughter

[11] Patent Number: 6,058,400
[45] Date of Patent: May 2, 2000

[54] HIGHLY AVAILABLE CLUSTER COHERENT FILESYSTEM

[75] Inventor: Gregory L. Slaughter, Palo Alto, Calif.

[73] Assignee: Sun Microsystems, Inc., Palo Alto, Calif.

[21] Appl. No.: 09/069,013

[22] Filed: Apr. 28, 1998

[51] Int. Cl.[7] .................................................. G06F 17/30
[52] U.S. Cl. ...................... 707/201; 707/200; 707/202; 707/1; 707/2; 707/3; 707/4; 707/5; 707/10; 707/100
[58] Field of Search .................................. 707/1, 2, 3, 4, 707/5, 10, 201, 200, 202, 100; 709/300; 395/701, 705, 706; 713/200

[56] References Cited

U.S. PATENT DOCUMENTS

| | | | |
|---|---|---|---|
| 5,892,900 | 4/1999 | Ginter | 713/200 |
| 5,916,307 | 6/1999 | Piskiel | 709/300 |
| 5,960,200 | 9/1999 | Eager | 395/705 |

*Primary Examiner*—Thomas G. Black
*Assistant Examiner*—Diane D. Mizrahi
*Attorney, Agent, or Firm*—Conley, Rose & Tayon, PC; B. Noel Kivlin

[57] ABSTRACT

A distributed filesystem operating on a distributed computing system uses existing local filesystems as building blocks. A cluster filesystem layer is added above the local filesystems to handle functions necessary for a distributed filesystem, such as data coherency. A meta-data stub is developed to flush meta-data from the local filesystem to a storage device. In one embodiment, the meta-data stub is a copy of the flush portion of the meta-data portion of a local filesystem. Additionally, the distributed filesystem supports a plurality of coherency algorithms and variable granularity. A user may select the coherency algorithm that best suits the computer system and granularity that best suits the access patterns of the computer system.

25 Claims, 5 Drawing Sheets

HIGHLY AVAILABLE CLUSTER COHERENT FILESYSTEM

BACKGROUND OF THE INVENTION

1. Field of the Invention

This invention relates to the field of filesystems and, more particular, to distributed coherent filesystems.

2. Description of the Related Art

Distributed computing systems, such as clusters, may include two or more nodes, which may be employed to perform computing tasks. Generally speaking, a node is a group of circuitry designed to perform one or more computing tasks. A node may include one or more processors, a memory and interface circuitry. Generally speaking, a cluster is a group of two or more nodes that have the capability of exchanging data between the nodes. A particular computing task may be performed upon one node, while other nodes perform unrelated computing tasks. Alternatively, components of a particular computing task may be distributed among the nodes to decrease the time required to perform the computing task as a whole. Clusters may provide highavailability such that if one node fails, the other nodes of the cluster can perform the required tasks. Generally speaking, a processor is a device configured to perform an operation upon one or more operations to produce a result. The operations are performed in response to instructions executed by the processor.

A filesystem may be employed by a computer system to organize files and to map those files to storage devices such as disks. Generally speaking, a storage device is a persistent device capable of storing large amounts of data. For example, a storage device may be a magnetic storage device such as a disk device, or an optical storage device such as a compact disc device. Data on storage devices may be organized as data blocks. The filesystem organizes the data blocks into individual files and directories of files. The data within a file may be non-contiguously stored in locations scattered across the storage device. For example, when a file is created, it may be stored in a continuous data block on the storage device. After the file has been edited, unused gaps within the file may be created. The filesystem may allocate the unused gaps to other files. Accordingly, the original file may now be stored in several non-contiguous data blocks.

Filesystems include internal data, called meta-data, to manage files. Meta-data may include data that indicates: where each data block of a file is stored, where memory-modified versions of a file are stored, and the permissions and owners of a file. The above uses of meta-data are for illustrative purposes only and are not intended to limit the scope of meta-data. In one conventional filesystem meta-data includes inode data. Inode data specifies where the data blocks of a file are stored on the storage device, provides a mapping from the filesystem name space to the file, and manages permissions for the file.

Directories are types of files that store data identifying files or subdirectories within the directory. Directory contents, like plain files, are data blocks. The data blocks that comprise a directory store data identifying the location of files or subdirectories within the directory.

Conventional filesystems, such as the Unix filesystem (UFS) or Veritas filesystem (VxFS), may not have a filesystem interface whereby the operating system can flush meta-data to a storage device. For the purpose of clarity, data that comprises data files and subdirectories will be referred to as "actual data" to distinguish it from "meta-data".

In distributed computer systems, filesystems may be implemented such that multiple nodes may access the same files. Generally speaking, a distributed filesystem is a filesystem designed to operate in a distributed computing environment. The distributed filesystem may handle functions such as data coherency. Distributed filesystems address several important features of distributed computing systems. First, because multiple nodes can access the same file, the system has high availability in the event of a node failure. Additionally, performance may be increased by multiple nodes accessing the data in parallel. The performance increase is especially evident in systems, such as Internet web servers, which service mainly read data requests.

Because multiple nodes may access the same data in a distributed filesystem, data coherency must be addressed. For example, a first node may modify a copy of a file stored in its memory. To ensure consistency, an algorithm must cause the first node to flush file data and meta-data to a storage device, prior to a second node accessing that file. Accordingly, the second node may require a way to cause the first node to flush the data to the storage device. In conventional filesystems, such as UFS and VxFS, external interfaces may be used to cause the filesystem to flush actual data to the storage device. Conventional filesystems, however, typically do not have an external interface to cause the filesystem to flush meta-data to the storage device. Accordingly, it is difficult to use conventional filesystem as building blocks of distributed filesystems, and distributed filesystems are typically developed from scratch or substantially modified versions of conventional filesystems. Unfortunately, it is a major investment of time and money to develop a filesystem from scratch, and even more of an investment to develop a distributed filesystem from scratch. Additionally, developing a distributed filesystem from scratch makes it difficult to leverage off evolving filesystem technology and to take advantage of the familiarity and support of existing filesystems. Users of a new filesystem must learn and adapt to an unfamiliar user interface. Alternatively, if a distributed filesystem is designed to accommodate users of different filesystems, the developer must develop and support many different versions of the distributed filesystem.

Another shortcoming of current distributed filesystems is that the filesystems typically only support one coherency algorithm. Different algorithms are advantageous in different systems. For example, one coherency algorithm may work well in systems with very few write operations, but not work well in systems with a higher percentage of write operations.

Still another shortcoming of current distributed filesystems is that the granularity of a coherency unit is typically fixed. Generally speaking, a coherency unit is a group of data for which coherency is maintained independent of other data. For example, the granularity of a coherency unit may be specified as a file. Accordingly, a coherency operation may be required if two nodes attempt to access the same file. This granularity may work well in systems with relatively small files that are infrequently written to by different nodes, but it may not work well in systems with large files to which different portions are written by different nodes. In the latter system, a granularity of one or more pages of a file may be advantageous.

What is desired is a distributed filesystem that uses largely unmodified conventional filesystems as building blocks, such that the distributed filesystem may interface to a conventional filesystem to provide the distributed nature of the filesystem. Additionally, a distributed filesystem in which the coherency algorithm and the granularity of a coherency unit may be selected by a client is desirable.

SUMMARY OF THE INVENTION

The problems outlined above are in large part solved by a highly-available cluster coherent filesystem in accordance with the present invention. The cluster filesystem is a distributed filesystem that includes a layer that interfaces between the rest of the operating system and conventional local filesystems operating on each node. A meta-data stub is developed that includes code for flushing meta-data to a storage. In one embodiment, the code of the meta-data stub is a copy of the internal code for flushing meta-data of the local filesystem. When a coherency operation is performed, the cluster filesystem may cause the local filesystem to flush actual data to a storage device and the meta-data stub to flush meta-data to the storage device. In this manner, a coherent cluster filesystem may be developed from conventional local filesystems.

Developing the cluster filesystem from conventional local filesystems has several distinct advantages. The functions performed by the local filesystem do not need to be replicated, which reduces the amount of code that needs to be developed, tested and supported. Additionally, the cluster filesystem may be easily adapted to a variety of local filesystems. To support a new local filesystem, minimal modifications may be required. For example, the interface between the cluster filesystem and local filesystem may be modified to support the new local filesystem interface, and the internal code of the local filesystem for flushing meta-data may be copied to the meta-data stub. Because the cluster filesystem may be easily adapted to new local filesystems, the cluster filesystem may support a variety of local filesystems. Accordingly, a user that prefers to use one conventional local filesystem rather then adapt to a new cluster filesystem may be supported. For example, a user may prefer the UFS. If a cluster filesystem is developed from scratch, the user interface may emulate the Veritas filesystem interface. The user that prefers the UFS may be required to learn the Veritas filesystem interface. To satisfy the user, a second version of the cluster filesystem that emulates the Veritas filesystem interface may be developed. This may not satisfy another user that prefers still another filesystem interface and requires two versions of the program to be developed, tested and supported. By developing a cluster filesystem from conventional local filesystems, the cluster filesystem may be easily adapted to variety of local filesystems. For example, when a new version of UFS is available, the cluster filesystem may operate with the new version with little or no modification. In contrast, a cluster filesystem developed from scratch would have to be redesigned to encompass the improvements of the new filesystem. Further, a cluster filesystem according to the present invention advantageously allows the cluster filesystem to take advantage of improvements in local filesystems. Still further, by leveraging existing filesystems, the present invention leverages the testing and reliability of the local filesystems. Accordingly, the instance of bugs within the filesystem may be reduced.

Additionally, the cluster filesystem may support a plurality of coherency algorithms. An administrator may select the coherency algorithm that best fits the operating environment of the computer system, which may increase system performance. Further, an administrator may select the granularity of a coherency unit which may reduce the number coherency operations in the system.

Broadly speaking, the present invention contemplates a distributed filesystem configured that includes a first node, a second node and a storage device, wherein the distributed filesystem includes a first local filesystem, a second local filesystem, a first meta-data stub, a cluster filesystem layer. The first local filesystem is configured to operate on the first node and the second local filesystem is configured to operate on the second node. The first and second local filesystems are non-distributed filesystems. The first meta-data stub is configured to flush meta-data of the first local filesystem to the storage device. The cluster filesystem layer is configured to interface to the first local filesystem, the second local filesystem and the first meta-data stub and is configured to output a command to the first meta-data stub to flush the meta-data to the storage device.

The present invention further contemplates a distributed computing system and a distribute filesystem. The distributed computing system includes a first node, a second node, a storage device and a data communication link coupled between the first node and the second node. The distributed filesystem includes a first local filesystem, a second local filesystem, a first meta-data stub, a cluster filesystem layer. The first local filesystem is configured to operate on the first node and the second local filesystem is configured to operate on the second node. The first and second local filesystems are non-distributed filesystems. The first meta-data stub is configured to flush meta-data of the first local filesystem to the storage device. The cluster filesystem layer is configured to interface to the first local filesystem, the second local filesystem and the first meta-data stub and is configured to output a command to the first meta-data stub to flush the meta-data to the storage device.

The present invention still further contemplates a method of maintaining coherency in a distributed computing system that includes a first node and a second node operating a cluster filesystem, and a storage device, wherein the cluster filesystem includes a first local filesystem, a first cluster filesystem layer that interfaces to the first local filesystem, a second local filesystem, and a second cluster filesystem layer that interfaces to the first cluster filesystem layer and the second cluster filesystem, the method comprising: developing a first meta-data stub to flush meta-data of the first node to a storage device; the first node receiving a coherency request from the second node; the first local filesystem of the first node flushing actual data to the storage device; and the first meta-data stub of the first node flushing meta-data to the storage device.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
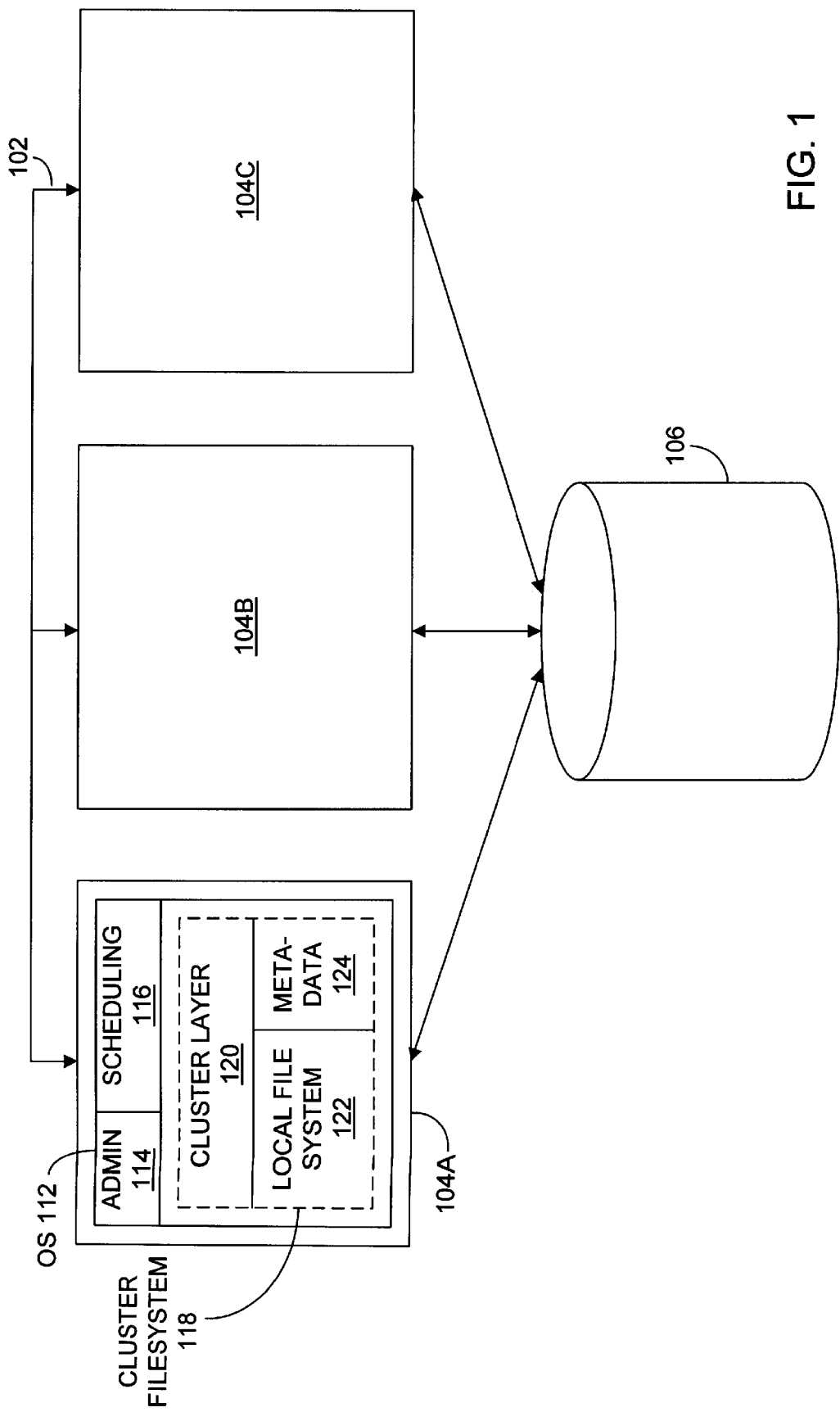
FIG. 1 is a block diagram a cluster according to one embodiment of the present invention.

Turning now to FIG. 1, a block diagram of a cluster including three nodes is shown according to one embodiment of present invention. Cluster 100 includes a communication interface 102, three nodes 104A–104C and a storage device 106. Each node is coupled to communication interface 102. Communication interface 102 provides a data communication path for transferring data between the nodes. Communication interface 102 contemplates a multi-drop link or point-to-point links. For example, communication interface 102 may include three point-to-point links. A first link may provide a communication path between node 104A and 104B, a second link may provide a communication path between node 104A and 104C, and a third link may provide a communication path between node 104B to 104C. In one embodiment, communication interface 102 is a scalable coherent interface (SCI) link. In one particular embodiment, the nodes use a TCP/IP protocol for transferring data over the SCI link. It is noted that three nodes are shown for illustrative purposes only. Other embodiments may employ more are less nodes.

Storage device 106 is coupled to nodes 104A–104C. Storage device 106 typically has storage capacity that exceeds the storage capacity of the memory of the nodes to which it is coupled. Data may be stored in storage device 106 when it is not currently being used by a node, and the data may be stored, or cached, in the memory of the node when the data is needed.

In the illustrative embodiment, storage device 106 is coupled to each node. Multiple connections permit multiple nodes to access storage device 106, which increases parallelism and availability. Parallelism is increased because multiple nodes may concurrently access the data of storage device 106. Parallelism is particularly enhanced in systems in which accesses are predominantly read accesses. Availability is increased because the data from storage device 106 may be accessed in the presence of a failure of one or more nodes.

In an alternative embodiment, a virtual link may exist between a node and storage device 106. Instead of directly accessing the storage device, the node may access the storage device via communication interface 102 and another node. For example, node 104C may not be directly connected to storage device 106. Node 104C may access the data of storage device 106 by communicating with node 104A or node 104B via communication interface 102. Node 104C may send a request for data to node 104A via communication interface 102. Node 104A may obtain the data from storage device 106 and convey to data to node 104C via communication interface 102. In one particular embodiment, it is transparent to the node requesting data whether storage device 106 is physically connected to the requesting node or whether the requesting node accesses storage device 106 via communication interface 102.

An operating system typically runs on each node of a computer system. FIG. 1 illustrates an operating system 112 running on node 104A. Nodes 104B and 104C may run similar or dissimilar operating systems. For simplicity, only the operating system running on node 104A is discussed below. Operating system (OS) 112 may control and coordinate the use of hardware on node 104A among the various client programs operating on the node. The functions performed by operating system 112 may include scheduling, filesystem manipulation, and administrative tasks such as program execution, communications and error detection. This list of functions is for illustrative purposes only and is not intended to be a complete list of the functions performed by OS 112. In the illustrative embodiment, OS 112 includes an administrative portion 114, a scheduling portion 116, and a cluster filesystem 118. Administrative portion 114 and scheduling portion 116 of OS 112 are conventional and well know to those of ordinary skill. Cluster filesystem 118 is discussed below.

Cluster filesystem 118 performs the functions of a distributed filesystem. Generally speaking, a distributed filesystem is a filesystem designed to operate in a distributed computing environment. The distributed filesystem may handle functions related to distributed computing such as data coherency. A portion of the distributed filesystem may operate on each node of a cluster. The instances of the distributed filesystem operating on each node may communicate within each other via networking software of the operating system to coordinate the administrative functions of the filesystem. Because multiple nodes may access data from one storage device, the distributed filesystem may ensure that coherency is maintained between the nodes.

In the illustrative embodiment, cluster filesystem 118 includes a cluster filesystem layer 120, a local filesystem 122 and a meta-data stub 124. Generally speaking, a local filesystem is a filesystem designed for computer systems in which only one node accesses a storage device. Accordingly, local filesystems typically do not provide for cluster-wide data coherency. In one embodiment, local filesystem 122 is an off-the-shelf filesystem. Generally speaking, an off-the-shelf filesystem is a non-custom filesystem which enjoys wide distribution and is well supported. Examples of off-the-shelf filesystems are UFS, VxFS, DOS and VMS.

Cluster filesystem layer 120 interfaces to local filesystem 122 and other instances of the cluster filesystem on other nodes. Cluster filesystem layer 120.provides many of the functions necessary for a distributed filesystem, such as data coherency. In one embodiment, cluster filesystem layer 120 exchanges coherency data with nodes 104B and 104C via communication interface 102. In one particular embodiment, when a node requests access to data which has been modified by node 104A, cluster filesystem layer 120 causes local filesystem 122 and meta-stub 124 to flush the modified data to storage device 106. The requesting node may then access the data from storage device 106.

As discussed above, local filesystem 122 typically does not have an interface to flush meta-data to storage device 106. Accordingly, meta-data stub 124 flushes meta-data to storage device 106. Generally speaking, meta-data stub 124 is a portion of cluster filesystem 118 that flushes the meta-data associated with the actual data stored by a node. In one embodiment, the code of local filesystem 122 responsible for flushing meta-data is copied to meta-data stub 124. Meta-data stub 124 may additionally include code that interfaces between cluster filesystem layer 120 and the code that flushes meta-data. In this manner, meta-data stub 124 may be relatively easily derived for local filesystem 122. In one embodiment, modifying cluster filesystem 118 to support a different local filesystem entails copying the meta-data flush portion of the filesystem, modifying the portion of the meta-data stub that interfaces to cluster filesystem layer 120 (or alternatively modifying the portion of cluster filesystem layer 120 that interfaces to meta-data stub 124) and modifying the portion of cluster filesystem layer 120 that interfaces to local filesystem 122. It is noted that the meta-data is typically externally accessible, but local filesystem 122 does not provide a method of flushing the data to storage device 106. If the meta-data of a particular filesystem is not accessible to the rest of the operating system, it is a simple modification to the filesystem (e.g., part of integration) to make the data accessible. Because this a simple easily-specified modification, third parties that develop local filesystems can release a version of their local filesystem which is compliant with the cluster filesystem. As a practicable matter, once the cluster filesystem becomes a commercial success with a few well-known local filesystems, such as UFS, other vendors of local filesystems would likely make the simple modifications. Further, local filesystem vendors would probably go further and provide the meta-data stub so their filesystem may be used with the cluster filesystem.

Figure 2:
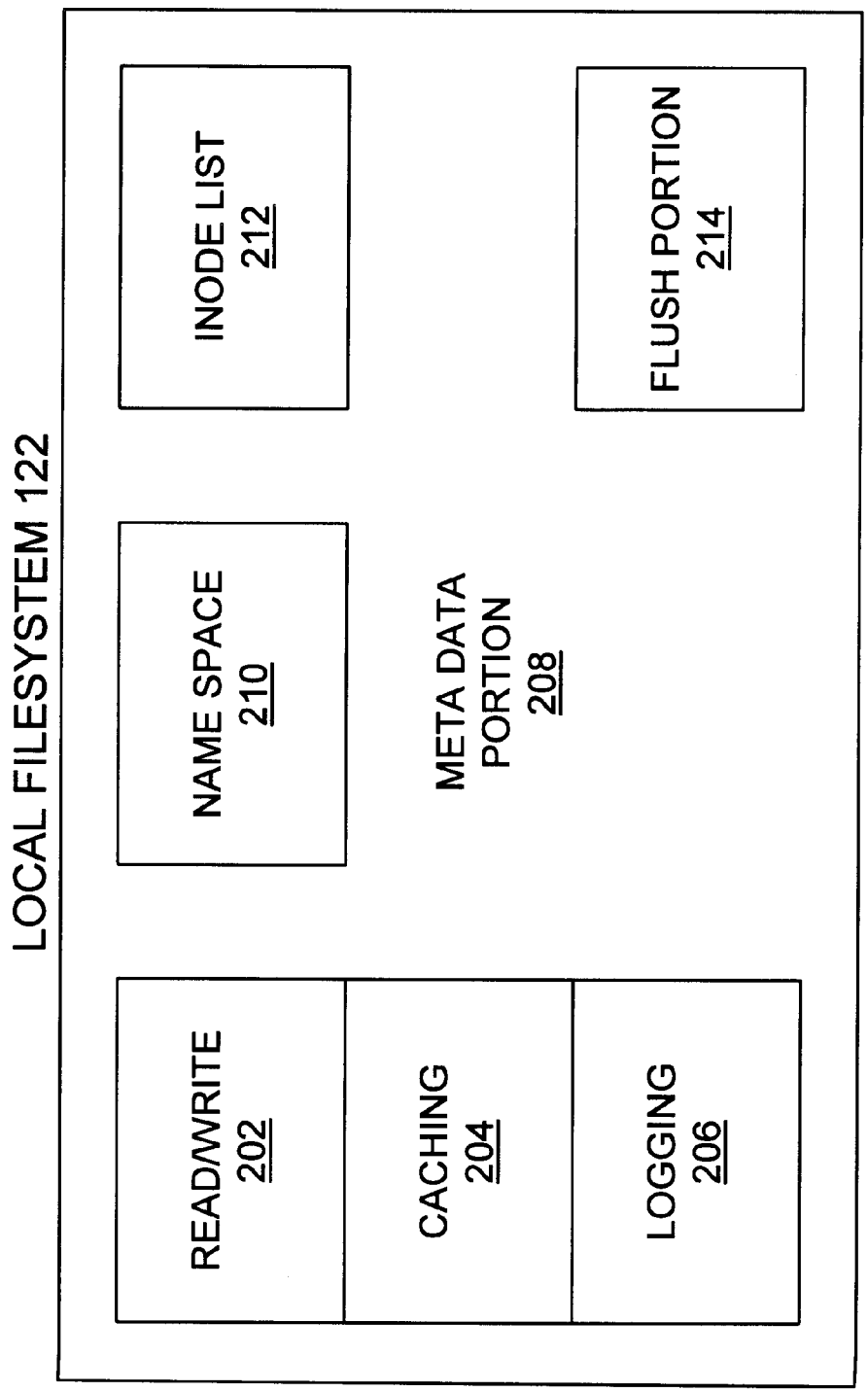
FIG. 2 is a block diagram of a local filesystem according to one embodiment of the present invention.

Turning now to FIG. 2, a block diagram of a local filesystem according to one embodiment of the present convention is shown. The portions of the local filesystem shown are for illustrative purposes only. Other embodiments of local filesystem 122 may include additional portions or may exclude an illustrated portion. In the illustrated embodiment, local filesystem 122 includes a read/write portion 202, a caching portion 204, a logging portion 206, and a meta-data portion 208. In the illustrated body, meta-data portion 208 includes a name space 210, an inode list 212 and a flush portion 214. Like local filesystem 122, the portions illustrated for meta-data portion 208 are for illustrative purposes only. Other embodiments of meta-data portion 208 may include additional portions or may exclude an illustrated portion.

Read/write portion 202 handles data accesses to files. For example, a request specifying the name of a file to write and the data to be written may be issued. Read/write portion 202 locates the desired file within storage device 106. The location of the file may be stored to a pointer to the file. The pointer may be used to compute the address of the next data location to be written. In similar manner, a read request may specify a name of a file to read and a location in memory to store the data read from storage device 106. Again, the specified file is located and a pointer that points to the next data to be read may be established. It is noted that rather than reading or writing data directly to/from the storage device, data may be stored, or cached, in a memory, typically main memory, of a node and then accessed. In the case of a read access the data may be read from storage device 106 and cached concurrently.

Caching portion 204 controls the storing of data from storage device 106 to memory. When data is accessed from storage device 106, caching portion 204 determines whether to store, or cache, that data to memory. In one embodiment, data from storage device 106 is cached in the main memory (not shown) of the node that accesses the data. In other embodiments, the data may be stored in other memories. For example, of memory specifically designed to cache data from storage device 106 may be included. If data is cached in memory, caching portion 204 may determine which data is flushed from memory to make space available for the new data.

Logging portion 206 may store filesystem transactions to a data file before the transactions are committed to storage device 106. If a system error occurs, the logged transactions since the last known clean (or consistent) state may be repeated to restore the state of storage device 106. Logging may be used in conjunction with checkpointing. Checkpointing transitions the filesystem to a clean state at regular intervals. Both logging and checkpointing decrease system recovery time at the expense of a small performance penalty.

As discussed above, local filesystem 122 maintains meta-data to identify, among other things, the location and properties of files stored on storage device 106. Meta-data includes but is not limited to: lists of open files, mappings of filenames to inodes, the location of the data blocks that comprise files, and the size of files. In the illustrated embodiment, meta-data portion 208 includes name space 210, inode list 212 and flush portion 214. Name space 210 provides a mapping of filenames to inodes, which store data identify the location of data blocks that comprise the file. Inode list 212 may store copies of inode data from storage device 106. The inode data is effectively cached in inode list 212 to reduce the access time of the inode data. Changes made to the inode data may be stored in inode list 212 prior to storing the changes to storage device 106.

Flush portion 214 flushes the meta-data of meta-data portion 208 to storage device 106. Meta-data may be flushed to storage device 106 for a variety of reasons. During checkpointing, meta-data may be flushed to storage device 106 to clean the filesystem. Meta-data may be flushed to storage device 106 when a user closes a file associated with the meta-data. Alternatively, meta-data may be flushed to storage device 106 so that another device may access the file associated with the meta-data. As discussed above, local filesystem 122 typically does not provide an interface for a user to request the flushing of meta-data. Because it may be necessary to flush meta-data to storage device 106 to maintain coherency between multiple nodes which access the data, another method of flushing meta-data may be devised. In the present invention, the meta-data is flushed by the meta-data stub.

Figure 3:
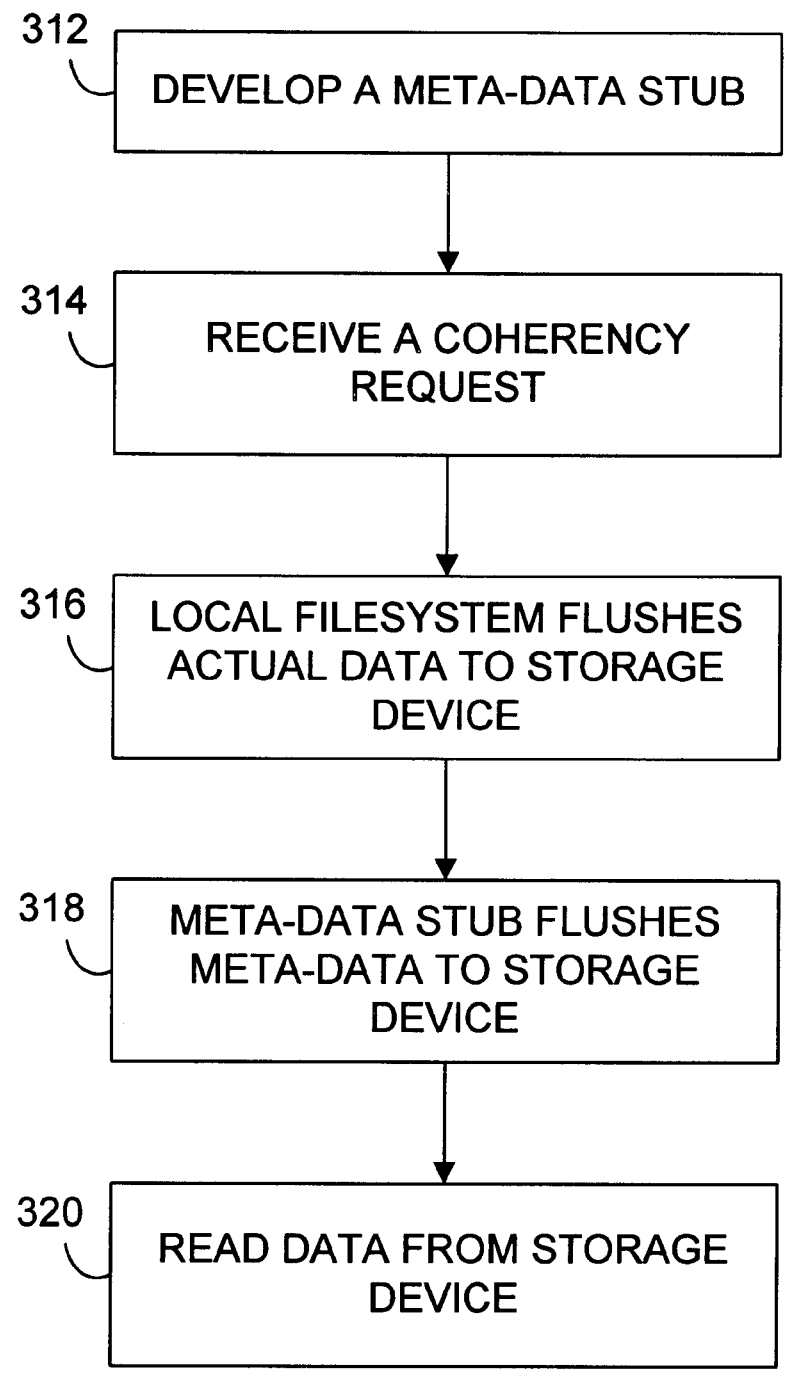
FIG. 3 is a flowchart diagram illustrating the handling of a coherency request according to one embodiment of the present invention.

Turning now to FIG. 3, a flowchart diagram illustrating the handling of a coherency request according to one embodiment of the present invention is shown. In one embodiment, a cluster filesystem includes a meta-data stub. As discussed above, a meta-data stub is a portion of code designed to flush meta-data to a storage device. The meta-data stub includes an interface to request the flushing of meta-data. In one embodiment, a cluster filesystem may request, via an interface, the meta-data stub to flush meta-data to the storage device. In one particular embodiment, the meta-data stub is a copy of a meta-data flush portion of a filesystem. In an alternative embodiment, the meta-data stub may be developed from scratch.

In step 314, a coherency request is received from a requesting node. Generally speaking, a coherency request is a request from another node of the distributed computing system to obtain access rights to a file or a portion of a file. Examples of coherency requests are read-to-own and read-to-share requests. The coherency request may require data to be flushed to a storage device. For example, if node 104A stores a modified copy of a file and receives a read-to-share request for that file from node 104B, node 104A may flush the modified file to storage device 106 so that node 104B may read the data. Because the coherency request was read-to-share, node 104A may retain a copy of the file. Alternatively, if the coherency request was a read-to-own request, node 104A may invalidate its copy of the file because node 104B may subsequently modified the file. If node 104A subsequently accesses the file, after a read-toown request, node 104A may send a coherency request to node 104B requesting either read or write access to the file.

In step 316, the filesystem flushes the actual data to the storage device. Local filesystems typically include a user interface to request the flushing of actual data to the storage device. For example, cluster filesystem layer 120 may output a request to local filesystem 122 requesting data from a file, or a portion of a file, to be flushed to storage device 106.

In step 318, the filesystem flushes meta-data to the storage device. In one embodiment, this step is performed by the meta-data stub developed in step 312. As discussed above, the meta-data stub includes an interface to request the flushing of meta-data to a storage device. In one embodiment, cluster filesystem layer 120 outputs a request to meta-data stub 124 to flush meta-data to storage device 106. To ensure consistent data among the nodes accessing the file, both actual data and meta-data must be flushed. For example, node 104A may add data to a file. The additional data may require additional data blocks to be allocated to the file. The location of these additional data block may be stored in the inode list of the meta-data portion of local filesystem 122. If this inode data is not flushed to storage device 106, other nodes that access the file may not be aware of the additional data blocks allocated to the file and accordingly may not access a consistent copy of the file. After the actual data and meta-data has been flushed, another node may consistently access the file.

When multiple entities access the same data, a mechanism is required to ensure that each entity has a consistent view of the file. The mechanism by which a system ensures that each entity has a consistent view of the file may be called a coherency algorithm. As discussed above, a cluster filesystem may implement a coherency algorithm to ensure consistent data among multiple nodes that access a file. Some coherency algorithms are better suited toward some computer systems than other coherency algorithms. In one embodiment of the present invention, cluster filesystem 118 supports two or more coherency algorithms. An administrator may select a coherency algorithm that best suits the computer system. It is noted that typically all instances of cluster filesystem 118 run the same coherency algorithm. A plurality of coherency algorithms are well known to those of ordinary skill in the art. Two coherency algorithms are discussed below. These coherency algorithms are discussed for illustrative purposes only. Other conventional coherency algorithms may be employed by a filesystem in accordance with the present invention.

Figure 4:
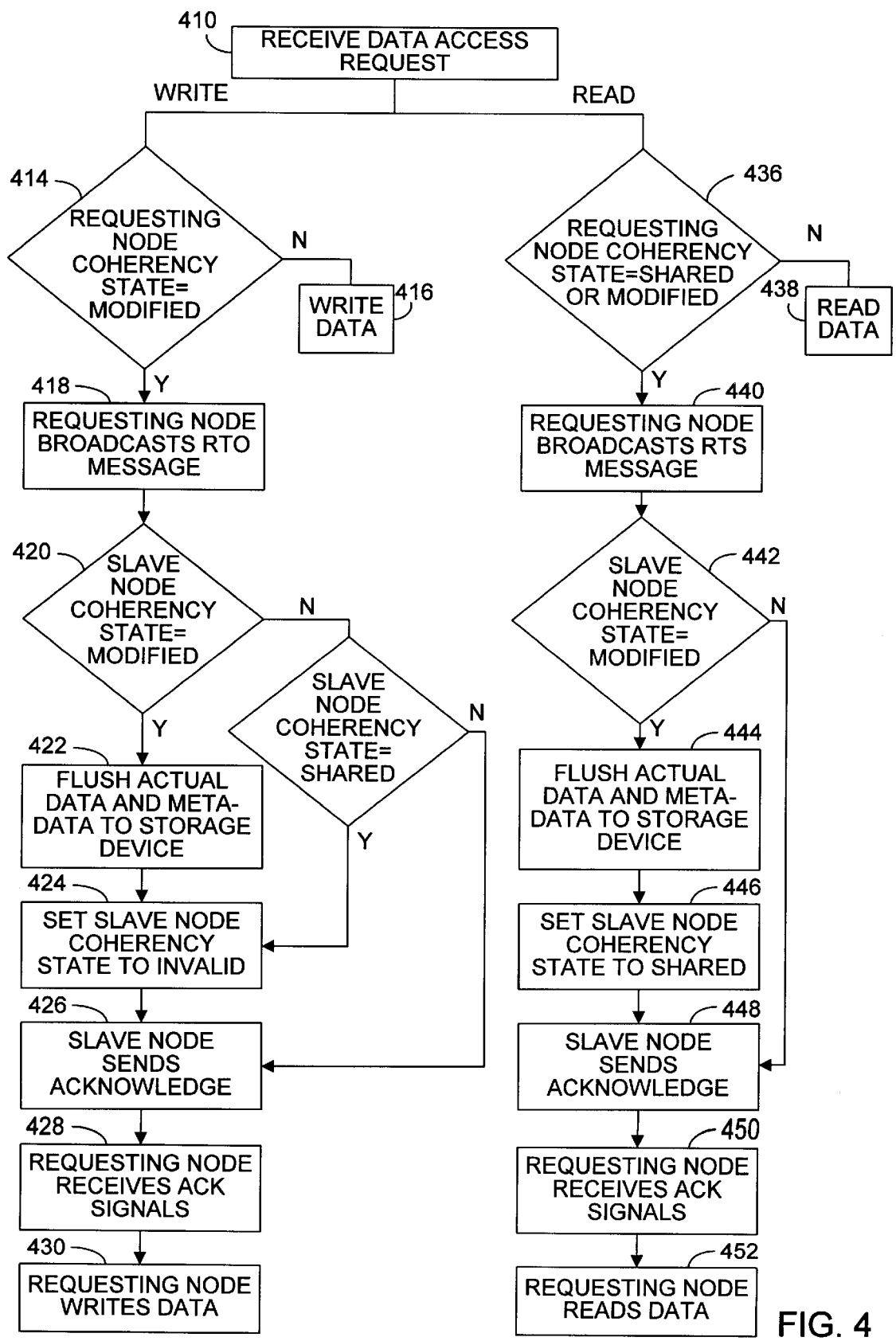
FIG. 4 is a flowchart diagram illustrating a first coherency algorithm according to one embodiment of the present invention.

Turning now to FIG. 4, a block diagram of a first coherency algorithm according to one embodiment of the present invention shown. In one embodiment, a coherency unit is marked with a coherency state that indicates the access rights to the data by a node. Generally speaking, a coherency unit is a group of data for which coherency is maintained independent of other data. For example, if a file is a coherency unit, a node may not access that file if another node has modified any data in the file. Alternatively, if a page is a coherency unit, a node may access a page of a file unless another node has modified that same page of the file. The size of the coherency unit may be referred to as the granularity of a coherency algorithm or the granularity of a coherency unit. The finer the granularity (i.e. the smaller the coherency unit) the more parallelism supported by the coherency algorithm. Finer granularity, however, requires more overhead to maintain coherency. In one embodiment of the present invention, the granularity of cluster filesystem 118 is variable. An administrator may set the granularity based on system requirements. It is noted that each instance of cluster filesystem 118 in a system typically maintains the same granularity.

A coherency state indicates whether the data of a coherency unit is valid and the read/write permission granted to a node. In one embodiment, the coherency states employed are: modified, shared and invalid. The modified state indicates that the node has an updated copy of the data in the coherency unit. Therefore, other nodes do not have valid copies of the data and only this node has write permission to the coherency unit, The shared state indicates that the node has a valid copy of the data in the coherency unit, but other nodes may also have a valid copies. Therefore, the node has read permission to the coherency unit, but not write permission. The invalid state indicates that the node does not have a valid copy of the coherency unit. Therefore, the node has neither read nor write permission to the coherency unit.

In step 410, a distributed filesystem receives a data access request. If the data access request is a write request, then the node that receives the request, called a requesting node, determines the coherency state of the coherency unit associated with the requested data. In step 414, is determined whether the coherency state of the coherency unit is modified. If the coherency state is modified, then in step 416 the requested data is written. Alternatively, if in step 414 the coherency state of the coherency unit is not modified, then in step 418 the requesting node broadcasts a read-to-own message to the other nodes of the distributed computing system.

Each node that receives the read-to-own message, called slave nodes, determines the coherency state of the coherency unit associated with the requested data in the slave node. For simplicity, only one slave node is illustrated in the FIG. 4. In another embodiment with multiple slave nodes, each slave node performs a substantially similar operation (steps 420–426). In decisional step 420, the slave node determines whether the coherency state of the coherency unit in the slave node is modified. If the coherency state is modified, then in step 422 the actual data and meta-data of the filesystem are flushed to a storage device. In step 424, the coherency state of the slave node is set to invalid. In step 426, the slave node sends an acknowledge signal to the requesting node.

In step 428, the requesting node waits until it receives acknowledge signals from the active slave nodes. In step 430, the requesting node has obtained write permission for the data and writes the requested the data.

If in decisional step 420, the coherency state of the slave node is not modified, then in decisional step 432 it is determined whether the coherency state of the slave node is shared. If the coherency state of the slave node is shared, then processing continues at step 424. Alternatively, if in decisional step 432 to the coherency state is not shared, then the coherency state is invalid and processing continues its step 426.

If the data access request received in step 410 is a read request, then in decisional step 436 it is determined whether the coherency state of the requesting node is shared or modified. If the coherency state is shared or modified, then in step 438 the requested data is read. Alternatively, if the coherency state in the requesting node is invalid, then in step 440 the requesting node broadcasts a read-to-share request to the other nodes (i.e. the slave nodes).

Each slave node receives the read-to-share message and, in decisional step 442, the slave node determines whether the coherency state of the slave node is modified. If the coherency state of the slave node is modified, then in step 444 the actual data and meta-data of the slave node are flushed to the storage device. In step 446, the coherency state of the slave node is set to shared. In step 448, the slave node sends an acknowledge signal to the requesting node.

In step 450, the requesting node waits until it receives an acknowledge signal from the active slave nodes. In step 452, the requesting node has obtained read permission for the data and reads the requested data.

If in decisional step 442 the coherency state of the slave node is not modified (i.e. the coherency state is shared or invalid), then processing continues at step 448.

The coherency algorithm illustrated in FIG. 4 is well-suited to distributed computing systems in which accesses are predominantly read accesses, e.g., Internet web servers. In this embodiment, read accesses are very efficient. When a node receives a read request, the read can be performed without any global operations if the requesting node has read or write permission (see steps 436 and 438). Generally speaking, this coherency algorithm may not be well-suited to distributed computing systems with a relatively high percentage of write transactions. Obtaining write permission requires broadcasting a read-to-own message and waiting for an acknowledgement signal from the slave nodes.

Figure 5:
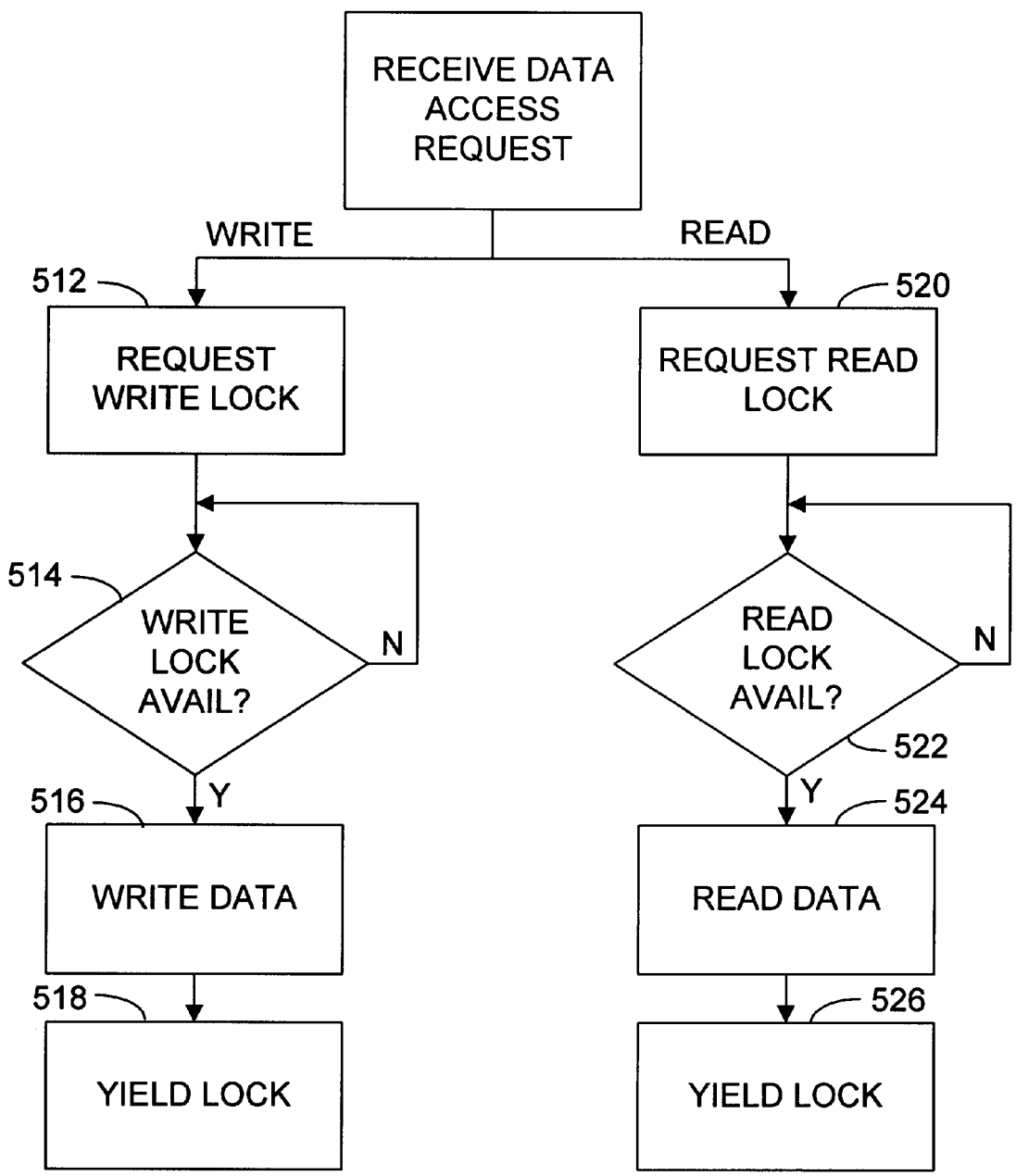
FIG. 5 is a flowchart diagram illustrating a second coherency algorithm according to one embodiment of the present invention.

Turning now to FIG. 5, a flowchart diagram of a second coherency algorithm according to one embodiment of the present invention is shown. Generally speaking, the coherency algorithm illustrated in FIG. 5 is better suited to a distributed computing system with a relatively high percentage of write requests. Rather than broadcasting a request to all nodes to gain write access, this coherency algorithm just requires the acquisition of a write lock from a distributed lock manager (DLM). FIG. 5 illustrates the coherency algorithm of one node. Other nodes in a distributed computing system may concurrently run substantially similar coherency algorithms.

In step 510, a data access request is received. If the data access request is a write request, then in step 512, access to a write lock is requested. A lock is a means of synchronizing access to a coherency unit by a plurality of devices, such as nodes. In embodiment, only one write lock is available for a coherency unit. Prior to writing the coherency unit, access to the write lock must be obtain. A distributed lock manager controls access to the locks. When a node obtains access to a write lock, the node marks the write lock as unavailable, performs the desired operation and then releases the write lock. In this manner, only one node at any time may access the coherency unit. In step 514, it is determined whether the write lock is available. If the write lock is not available, the node waits for the lock to be available. When the write lock is available, the requested data is written in step 516 and the write lock is yielded in step 518.

If the data access request in step 510 is a read request, then in step 520, access to a read lock is requested from the distributed lock manager. In one embodiment, a plurality of read locks to the same coherency unit may be available concurrently. By allowing multiple read locks, multiple nodes may read the data concurrently. No read lock may be granted when a write lock is granted.

In step 522, it is determined whether a read lock is available. If a read lock is not available, then the node waits for a read lock to become available. When a read lock is available, the requested data is read in step 524 and the read lock yielded in step 526.

Numerous variations and modifications will become apparent to those skilled in the art once the above disclosure is fully appreciated. It is intended that the following claims be interpreted to embrace all such variations and modifications.

What is claimed is:

1. A distributed filesystem configured to operate on a distributed computing system that includes a first node, a second node and a storage device, wherein said distributed filesystem comprises:

a first local filesystem configured to operate on said first node and a second local filesystem configured to operate on said second node, wherein said first and second local filesystems are non-distributed filesystems;

a first meta-data stub configured to flush meta-data of said first local filesystem to said storage device; and a cluster filesystem layer configured to interface to said first local filesystem, said second local filesystem and said first meta-data stub and configured to request said first meta-data stub to flush said meta-data to said storage device.

2. The distributed filesystem of claim 1 wherein said first local filesystem includes a meta-data portion, wherein said first meta-data stub includes a copy of a flush portion of said meta-data portion of said first local filesystem.

3. The distributed filesystem of claim 1 further comprising a second meta-data stub configured to flush meta-data of said second local filesystem to said storage device, wherein said cluster filesystem layer is further configured to interface to said second meta-data stub and configured to request said second meta-data stub to flush said meta-data of said second local filesystem to said storage device.

4. The distributed filesystem of claim 3 further comprising a third node, a third local filesystem and a third meta-data stub, wherein said cluster filesystem layer is further configured to interface to third local filesystem and said third meta-data stub and configured to request said third meta-data stub to flush meta-data of said third local filesystem to said storage device.

5. The distributed filesystem of claim 1 wherein said distributed filesystem is configured to implement a first coherency algorithm or a second coherency algorithm in dependence upon an input to said distributed filesystem.

6. The distributed filesystem of claim 1 wherein a granularity of a coherency algorithm is defined by an input to said distributed filesystem.

7. The distributed filesystem of claim 1 wherein said local filesystems are off-the-shelf filesystems.

8. A distributed computing system comprising:

a first node, a second node, a storage device and a data communication link coupled between said first node and said second node; and a distributed filesystem configured to operate on said distributed computing system, wherein said distributed filesystem includes:

a first local filesystem configured to operate on said first node and a second local filesystem configured to operate on said second node, wherein said first and second local filesystems are non-distributed filesystems;

a first meta-data stub configured to flush meta-data of said first local filesystem to said storage device; and a cluster filesystem layer configured to interface to said first local filesystem, said second local filesystem and said first meta-data stub and configured to output a command to said first meta-data stub to flush said meta-data to said storage device.

9. The distributed computing system of claim 8 wherein said first local filesystem includes a meta-data portion, wherein said first meta-data stub is a copy of a flush portion of said meta-data portion of said first local filesystem.

10. The distributed computing system of claim 8 further comprising a second meta-data stub configured to flush meta-data of said second local filesystem to said storage device.

11. The distributed computing system of claim 10 further comprising a third node, a third local filesystem and a third meta-data stub.

12. The distributed computing system of claim 8 wherein said distributed filesystem is configured to implement a first coherency algorithm or a second coherency algorithm in dependence upon an input to said distributed filesystem.

13. The distributed computing system of claim 8 wherein a granularity of a coherency algorithm is defined by an input to said distributed filesystem.

14. The distributed computing system of claim 8 wherein said local filesystems are off-the-shelf filesystems.

15. A method of maintaining coherency in a distributed computing system that includes a first node and a second node operating a cluster filesystem, and a storage device, wherein said cluster filesystem includes a first local filesystem, a first cluster filesystem layer that interfaces to said first local filesystem, a second local filesystem, and a second cluster filesystem layer that interfaces to said first cluster filesystem layer and said second cluster filesystem, said method comprising:

developing a first meta-data stub to flush meta-data of said first node to a storage device;

said first node receiving a coherency request from said second node;

said first local filesystem of said first node flushing actual data to said storage device; and said first meta-data stub of said first node flushing meta-data to said storage device.

16. The method of maintaining coherency of claim 15 further comprising said second node reading said data from said storage device.

17. The method of maintaining coherency of claim 15 wherein said meta-data stub includes a copy of a meta-data flush portion of said first local filesystem.

18. The method of maintaining coherency of claim 15 wherein said cluster filesystem is configured to implement either a first coherency algorithm or a second coherency algorithm.

19. The method of maintaining coherency of claim 15 wherein a granularity of a coherency algorithm is variable.

20. A computer-readable storage medium comprising program instructions for maintaining coherency in a distributed computing system that includes a storage device, wherein said program instructions execute on a first node or a second node of said distributed computing system and said program instructions are operable to implement the steps of:

receiving a coherency request;

flushing actual data to said storage device, wherein said program instructions that implement said step of flushing actual data are part of a local filesystem; and flushing meta-data to said storage device, wherein said program instructions that implement said step of flushing meta-data are part of a meta-data stub that includes data copied from a flush meta-data portion of said local filesystem.

21. The medium of claim 20 further comprising program instructions that read said data flushed to said storage medium.

22. The medium of claim 20 further comprising program instructions operable to implement either a first coherency algorithm or a second coherency algorithm.

23. The medium of claim 20 further comprising program instructions operable to receive an input selecting a coherency algorithm.

24. The medium of claim 20 further comprising program instructions operable to vary a granularity of a coherency algorithm.

25. The medium of claim 24 further comprising program instructions operable to receive an input selecting said granularity.

* * * * *